(12) United States Patent
Monti (10) Patent No.: US 11,046,524 B2
(45) Date of Patent: Jun. 29, 2021

(54) TRANSPORTING SYSTEM FOR TRANSPORTING PRODUCTS

(71) Applicant: MARCHESINI GROUP S.p.A., Pianoro (IT)

(72) Inventor: Giuseppe Monti, Pianoro (IT)

(73) Assignee: MARCHESINI GROUP S.P.A., Pianoro (IT)

(*) Notice: Subject to any disclaimer, the term of this patent is extended or adjusted under 35 U.S.C. 154(b) by 306 days.

(21) Appl. No.: 16/329,580

(22) PCT Filed: Sep. 27, 2017

(86) PCT No.: PCT/IB2017/055905
§ 371 (c)(1),
(2) Date: Feb. 28, 2019

(87) PCT Pub. No.: WO2018/060882
PCT Pub. Date: Apr. 5, 2018

(65) Prior Publication Data
US 2019/0210810 A1 Jul. 11, 2019

(30) Foreign Application Priority Data
Sep. 29, 2016 (IT) .......... 102016000097555

(51) Int. Cl.
*B65G 17/20* (2006.01)
*B65G 39/20* (2006.01)
(Continued)

(52) U.S. Cl.
CPC .............. *B65G 17/20* (2013.01); *B61B 13/00* (2013.01); *B65G 21/22* (2013.01); *B65G 39/20* (2013.01)

(58) Field of Classification Search
CPC ........ B65G 17/20; B65G 39/20; B65G 9/002; B65G 9/008; B65G 21/22; B61B 13/00; B61B 13/04
See application file for complete search history.

(56) References Cited

U.S. PATENT DOCUMENTS 1,312,417 A  8/1919  Mosher
2,932,258 A * 4/1960  Marquard ............... B61B 13/04
                                                 104/120
(Continued)

FOREIGN PATENT DOCUMENTS

CH   537826 A * 7/1973  ............ B61B 13/04
GB   347409 A    4/1931
(Continued)

*Primary Examiner* — Mark A Deuble
(74) *Attorney, Agent, or Firm* — R. Neil Sudol; Henry D. Coleman (57) ABSTRACT

A transport system includes a guide rail having a loop-wound pathway with straight portions and curved portions linking the straight portions. A carriage is movable along the guide rail, a first and a second shaft being mounted on the carriage transversely to the carriage movement direction. A first pair of rollers are mounted rotatably on the first shaft so that a first roller contacts the internal wall of the guide rail and a second roller contacts the external wall of the guide rail. A second pair of rollers mounted rotatably on the second shaft include a first roller in contact with the internal wall of the guide rail and a second roller in contact with the external wall. The first and the second shaft are mounted on the carriage for pivoting about an axis perpendicular to the carriage.

10 Claims, 6 Drawing Sheets

(51) Int. Cl.
*B65G 21/22* (2006.01)
*B61B 13/00* (2006.01)

(56) References Cited

U.S. PATENT DOCUMENTS

| | | | | |
|---|---|---|---|---|
| 3,525,306 | A * | 8/1970 | Bubic | B61B 13/04 |
| | | | | 104/95 |
| 5,086,705 | A * | 2/1992 | Jarvis | B23Q 1/262 |
| | | | | 105/141 |
| 5,445,080 | A * | 8/1995 | Austin | B61B 13/04 |
| | | | | 104/119 |
| 10,351,350 | B2 * | 7/2019 | Nara | B65G 35/06 |
| 2005/0061637 | A1 * | 3/2005 | Kilby | A21C 13/02 |
| | | | | 198/852 |
| 2009/0250321 | A1 | 10/2009 | Krisl et al. | |
| 2011/0303117 | A1 * | 12/2011 | Timan | B61B 13/04 |
| | | | | 105/199.2 |
| 2012/0160126 | A1 * | 6/2012 | Rathbun | B61B 10/022 |
| | | | | 105/238.1 |
| 2015/0027338 | A1 * | 1/2015 | Aumann | B60L 13/03 |
| | | | | 104/290 |
| 2017/0225693 | A1 * | 8/2017 | Fenile | B61B 3/00 |
| 2018/0037413 | A1 * | 2/2018 | Stauber | B65G 17/32 |
| 2019/0375434 | A1 * | 12/2019 | Evans | A63G 21/22 |

FOREIGN PATENT DOCUMENTS

GB 813769 A 5/1959
WO WO 2014/046616 A1 3/2010

* cited by examiner

TRANSPORTING SYSTEM FOR TRANSPORTING PRODUCTS

FIELD OF THE INVENTION

The present invention relates to a transport system for transport of products.

DESCRIPTION OF THE PRIOR ART

In the sector of automatic work, production and/or packaging systems, there is a known need to transport products, objects, articles, components etc. along a predefined pathway so as to be able to know, exactly and precisely, the position and orientation thereof in relation to specific working steps which are to be carried out.

A known transport system used for transport of products comprises at least a mobile carriage, for transport of at least a relative product, and at least a guide rail having a loop-wound pathway along which the carriage is guided and moved, by relative motor means, such as for example linear motors, or loop-wound conveyor belts on relative drive pulleys.

The guide rail is conformed so as to exhibit an internal wall and an external wall; usually the internal wall and the external wall are mutually inclined and have a converging extension towards a common point.

The transport system further comprises cylindrical rollers each of which is rotatably mounted on a relative shaft which is predisposed rigidly and fixed on the carriage so that rollers have a predetermined configuration that is fixed with respect to the guide rail and can engage the guide rail with the relative lateral wall thereof.

In particular, a first series of rollers is predisposed on the carriage in such a way that the rollers can roll on the internal wall of the guide rail, and a second series of rollers in such a way that they are in contact and can roll on the external wall of the guide rail, so as to be able to guarantee the stability of orientation and position of the carriage during the movement thereof along the guide rail.

The guide rail, as mentioned above, has a closed loop-wound shape, and comprises two straight portions and two curved portions for linking the straight portions.

A first drawback of this transport system consists in the stability of the carriage during the passage thereof from a straight portion to a curved portion, as some of the rollers can lose contact with the internal wall or external wall of the guide rail and therefore the other rollers are subjected to a greater rolling friction.

The onset of these circumstances not only influences the stability of the carriage, with repercussions on the correct orientation and positioning of the product to be transported, but also determines more rapid wear on the rollers.

Document US2016/0031648 relates to a transport system for transporting products of the above-described type, which aims at reducing the degree of wear on the rollers.

The transport system described in the above-mentioned document comprises, as in the previously-described one, a mobile carriage and a loop-wound guide rail along which the carriage is guided and moved by motor means.

The transport system described in this document comprises a first group of rollers and a second group of rollers mounted rotatably on relative shafts which are rigidly predisposed in a fixed arrangement on the carriage for transport thereof along the guide rail.

In particular, the transport system described in document US2016/0031648 is configured in such a way that the rollers of the first group of rollers are predisposed and mounted on the carriage so as to have a fixed and prefixed configuration with respect to the guide rail and so as to be in contact with the internal wall and the external wall of the guide rail only at the straight portions, and not to be in contact with the two walls in the curved portions, while the rollers of the second group of rollers are predisposed and mounted on the carriage so as to have a fixed and prefixed configuration with respect to the guide rail and so as to be in contact with the internal wall and the external wall of the guide rail only at the curved portions, and not to be in contact with the two walls in the straight portions.

The first group of rollers comprises at least an internal roller, and at least a pair of external rollers: the internal roller and the pair of external rollers are predisposed rotatably on relative shafts which are mounted on the carriage according to a fixed configuration so that the internal roller is in contact with the internal wall of the guide rail only at a relative straight portion, and the pair of external rollers are in contact with the external wall of the guide rail only at a relative straight portion.

Therefore the internal roller and the pair of external rollers of the first group of rollers are contemporaneously in contact with the two walls of the guide rail along the straight portions while they are not in contact with the two walls when the carriage follows a curved portion of the guide rail.

In turn, the second group of rollers comprises at least an internal roller, and at least a pair of external rollers: the internal roller and the pair of external rollers are predisposed rotatably on relative shafts which are mounted on the carriage according to a fixed configuration so that the internal roller is in contact with the internal wall of the guide rail only at a relative curved portion, and the pair of external rollers are in contact with the external wall of the guide rail only at a relative curved portion.

Therefore the internal roller and the pair of external rollers of the second group of rollers are contemporaneously in contact with the two walls of the guide rail along the curved portions while they are not in contact with the two walls when the carriage follows a straight portion. of the guide rail.

In the transport system described in document US2016/0031648 described above there are however some drawbacks.

Firstly, problems can arise concerning the stability of the carriage at the change of direction of the carriage of the guide rail from the straight portion to the curved portion, as there is a moment of transition in which the rollers of the first group of rollers lose contact with the internal walls and the external walls of the guide rail in the final part of the straight portion, while the rollers of the second group of rollers must instead gain contact with the two walls at the start of the curved portion. The same drawback occurs during the change of direction of the guide rail from the curved portion to the straight portion.

The onset of these circumstances can lead to an increase in stresses on the rollers of the two groups, with the consequence that the reduction in the degree of wear is not as good as was hoped for.

SUMMARY OF THE INVENTION

The aim of the present invention is therefore to provide a new transport system for transporting products that is able to obviate the above-mentioned drawbacks present in the transport systems of known type.

In particular, an aim of the present invention is to provide a new transport system so as to guarantee the stability of the carriage, and therefore of the product which is transported, on the changing of the advancement direction of the carriage from a straight portion to a curved portion, and vice versa, while at the same time keeping the degree of wear on the rollers to a minimum.

The above-cited aims are attained with a transport system according to the contents of claim 1.

Further characteristics and advantageous aspects of the transport system of the invention are set down in the various dependent claims.

BRIEF DESCRIPTION OF THE DRAWINGS

The characteristics of a preferred, but not exclusive, embodiment of the transport system of the present invention will be described in the following with reference to the appended tables of drawings, in which.

DESCRIPTION OF THE PREFERRED EMBODIMENTS

With reference to the accompanying tables of drawings, reference letter (5) denotes the transport system for transporting products of the present invention. The transport system (5) comprises at least a guide rail (1) and at least a carriage (2) for transport of at least a relative product.

The guide rail (1) has a loop-wound pathway comprising straight portions (R) and curved portions (C) for connecting the straight portions (R) (see for example FIGS. 1A and 1B), the guide rail (1) being conformed so as to have an internal rolling wall (11) and an external rolling wall (12) (visible for example in FIG. 2 in the sectioned part, upper on the left); the carriage (2) being moved (for example via activating means comprising linear motors that are not illustrated) with a movement direction (M) along the loop-wound pathway of the guide rail (1).

The transport system (S) further comprises a first pair (3) of rollers (31, 32) and a second pair (4) of rollers (41, 42) predisposed on the carriage (2).

The peculiarities of the transport system (S) of the present invention consist in the fact that it comprises a first shaft (30) mounted and predisposed on the carriage (2) transversally to the movement direction (M) of the carriage (2);

and a second shaft (40) also mounted and predisposed on the carriage (2) transversally to the movement direction (M) of the carriage (2);

and in that:

the rollers (31, 32) of the first pair (3) of rollers are rotatably mounted on the first shaft (30), flanked to and distanced from one another so that a first roller (31) is arranged internally of the guide rail (1) and has a contact portion (310) of the lateral surface thereof in contact with the internal wall (11) of the guide rail (1) and can roll on the internal wall (11) when the carriage (2) is moved in the movement direction (M) and so that a second roller (32) is arranged externally of the guide rail (1) and has a contact portion (320) of the lateral surface thereof in contact with the external wall (12) of the guide rail (1) and can roll on the external wall (12) when the carriage (2) is moved in the movement direction (M);

the rollers (41, 42) of the second pair (4) of rollers are rotatably mounted on the second shaft (40), flanked to and distanced from one another so that a first roller (41) is arranged internally of the guide rail (1) and has a contact portion (410) of the lateral surface thereof in contact with the internal wall (11) of the guide rail (1) and can roll on the internal wall (11) when the carriage (2) is moved in the movement direction (M) and so that a second roller (42) is arranged externally of the guide rail (1) and has a contact portion (420) of the lateral surface thereof in contact with the external wall (12) of the guide rail (1) and can roll on the external wall (12) when the carriage (2) is moved in the movement direction (M);

the first shaft (30) and the second shaft (40) being predisposed and mounted on the carriage (2) so as to be pivoted according to an axis perpendicular to the carriage (2), the axis being perpendicular to a plane comprising the first shaft (30) and the second shaft (40).

Figure 2:
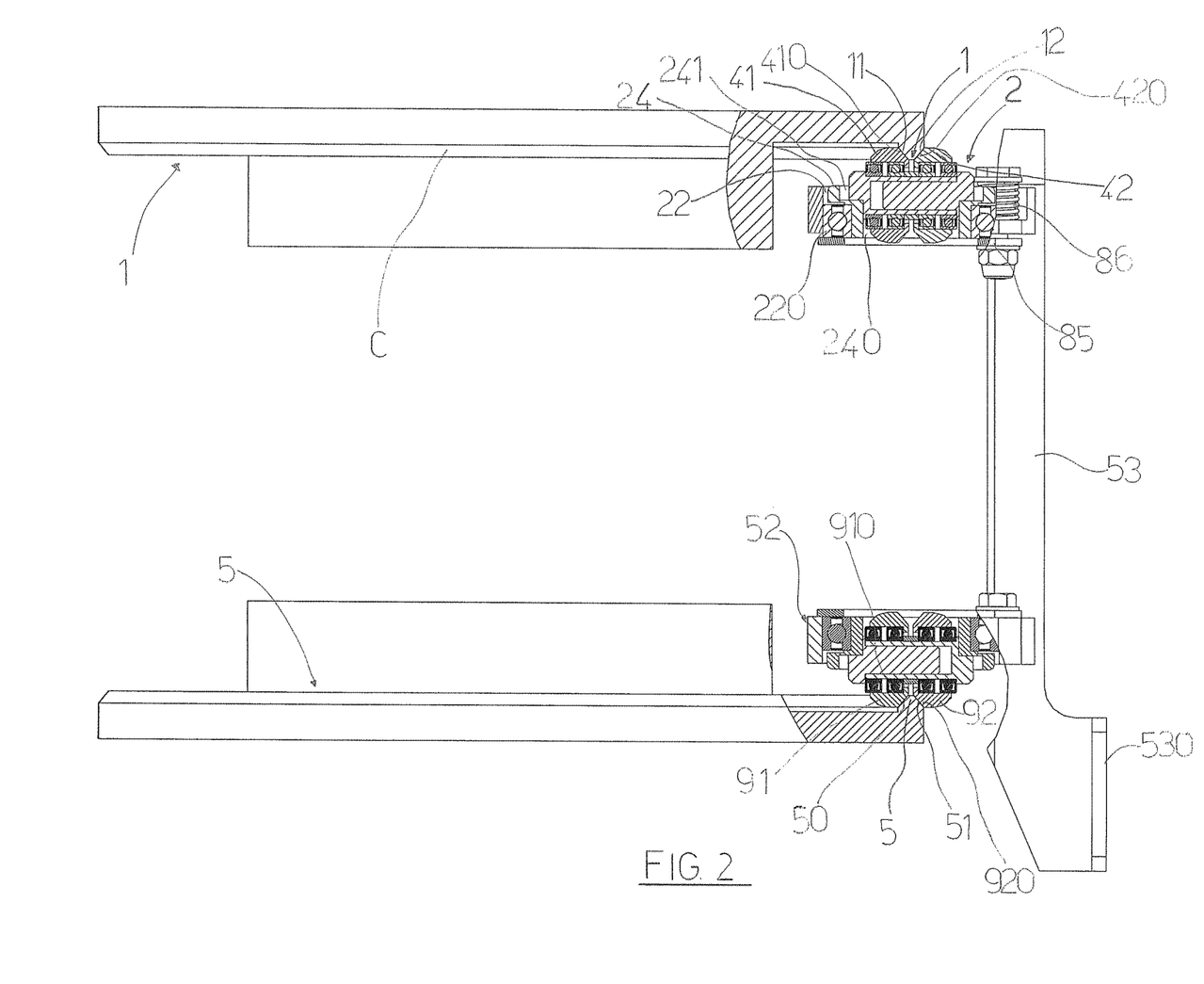
FIG. 2 is a lateral view of the transport system of the invention, wherein a partial transversal section has been carried out according to vertical section plane II-II indicated in FIG. 1, with the aim of revealing some significant elements of the transport system of the invention.

In FIG. 2, in the part in section high on the right, the position of the rollers (41, 42) of the second pair (4) of rollers is illustrated with respect to the internal wall (11) and the external wall (12) of the guide rail (1); the same arrangement, though not illustrated, is true of the rollers (31, 32) of the second pair (3) of rollers as described and specified in the foregoing.

The fact that in the transport system (S) of the invention the first shaft (30) on which the rollers (31, 32) of the first pair (3) of rollers are mounted, and the second shaft (40) on which the rollers (41, 42) of the second pair (4) of rollers are mounted, are predisposed on the carriage (2) so as to be pivoted according to an axis perpendicular to the carriage (2), the axis being perpendicular to a plane comprising the first shaft (30) and the second shaft (40), enables the rollers (31, 32) of the first pair (3) of rollers and the rollers (41, 42) of the second pair (4) of rollers to autonomously adapt a position/orientation thereof with respect to the internal wall (11) and the external wall (12) of the second guide rail (1) at the change of direction of the second guide rail (1) in the passage from a straight portion to a curved portion, and vice versa.

With this particular specification, therefore, the rollers (31, 32, 41, 42) can, with no force or stress, adapt and change the orientation thereof with respect to the carriage (2) at each change of direction of the guide rail (1), due to the possibility of the first shaft (30) and the second shaft (40) to be pivoted with respect to the carriage (2) according to an axis that is perpendicular to the carriage (2), so that the contact portions (310, 320, 410, 420) of the relative lateral surfaces of the rollers (31, 32, 41, 42) remain always in contact with, and can therefore roll on, the internal wall (11) and external wall (12) of the guide rail (1) independently of the changes of direction of the second guide rail (1).

In this way, the transport system (S) according to the invention guarantees an excellent stability of the carriage (2) also at each change of direction of the guide rail (1), in the passage from a straight portion to a curved portion, and vice versa, as all the rollers of the two pairs of rollers are always in contact with the internal wall and the external wall of the guide rail.

Further, the rollers are always in contact with the internal and external walls of the guide rail with no force or particular stress, and consequently the degree of wear is particularly contained and reduced with respect to the transport systems of the prior art mentioned in the preamble.

Further advantageous aspects of the transport system (S) proposed by the present invention are described in the following.

Figure 6:
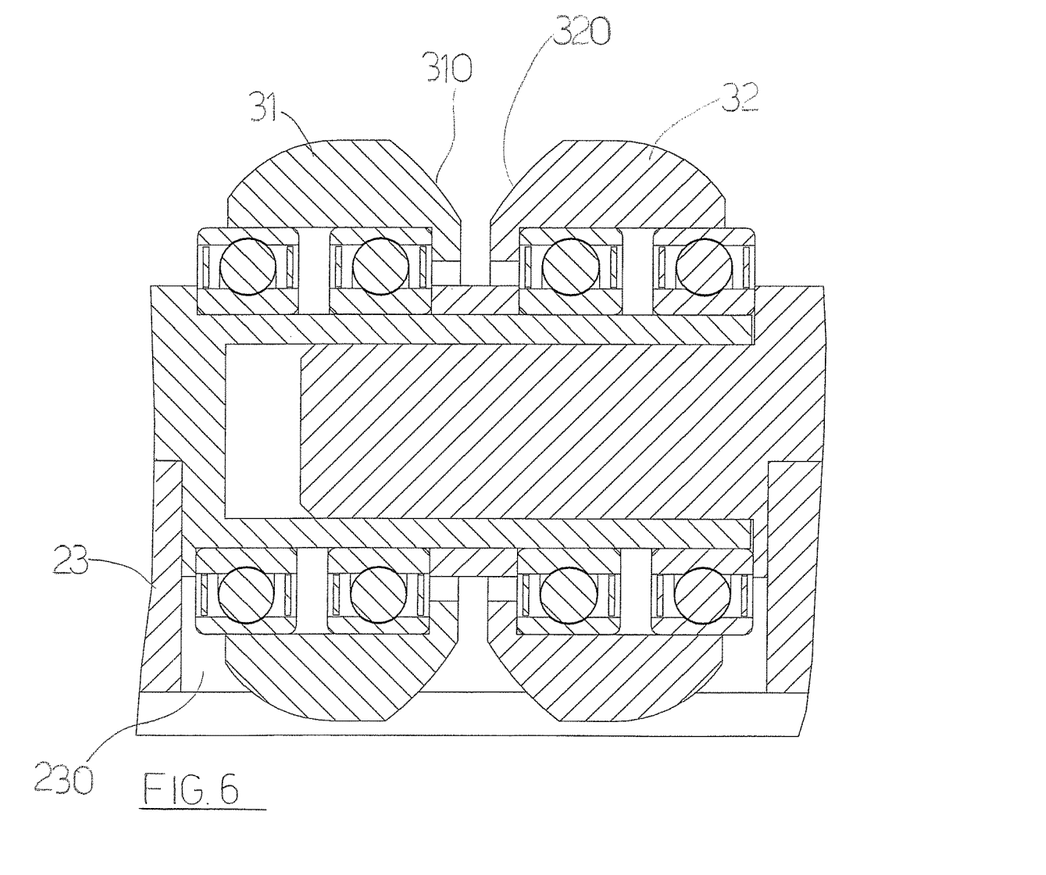
FIG. 6 illustrates detail K of FIG. 5 in larger scale.

In a first preferred aspect, the contact portions (310, 320, 410, 420) of the lateral surfaces of the rollers (31, 32, 41, 42) with which the rollers (31, 32, 41, 42) are in contact with the internal wall (11) and external wall (12) of the guide rail (1) are conformed as a portion of a spherical cap (see in this regard FIG. 6 which represents a detail in larger scale and in transversal section of the rollers of the first pair of rollers; this characteristic, though not illustrated in the figures is present, as mentioned, also in the rollers of the second pair of rollers).

This particular conformation of the contact portions (310, 320, 410, 420) of the lateral surfaces of the rollers (31, 32, 41, 42), is such that the contact between the rollers and the internal wall and external wall of the guide rail occurs on limited and reduced portions of the lateral surfaces of the rollers, further reducing the degree of wear on the rollers, and therefore enabling a greater duration over time.

In the preferred embodiment illustrated in the accompanying figures, the carriage (2) comprises a first through-seating (21) and a second through-seating (22), with a first support element (23) predisposed in the first through-seating (21) so as to be rotatable in said first through-seating (21) according to an axis that is perpendicular to the carriage (2) and a second support element (24) predisposed in the second through-seating (22) so as to be rotatable in said second through-seating (22) according to an axis that is perpendicular to the carriage (2).

The first shaft (30) is mounted and predisposed on said first support element (23) while the second shaft (40) is mounted and predisposed on the second support element (24).

According to further preferred aspects, as illustrated in detail in FIGS. 4A, 4B, 5, 6, the first support element (23) comprises a central housing (230) and two slots (231, 232) arranged on opposite sides of the central housing (230) and communicating with the central housing (230), the central housing (230) having a shape and dimension such as to be able to accommodate and freely receive internally thereof the first pair (3) of rollers (31, 32) so as to enable the rollers (31, 32) to be able to freely rotate about the first shaft (30) and the two slots (231, 232) being arranged and dimensioned so as to be able to receive internally thereof, by form coupling, the ends of the first shaft (30).

In turn, in a like way, the second support element (24) comprises a central housing (240) and two slots (241, 242) which are arranged on opposite sides of the central housing (240) and are communicating with the central housing (240), the central housing (240) having a shape and dimension such as to be able to accommodate and freely receive internally thereof the second pair (4) of rollers (41, 42) so as to enable the rollers (41, 42) to be able to freely rotate about the second shaft (40) and the two slots (241, 242) being arranged and dimensioned so as to be able to receive internally thereof by form coupling the ends of the second shaft (40).

The portion of the lateral surface of the rollers (31, 32) of the first pair (3) of rollers opposite the contact portion (310, 320) is advantageously tapered: in this way it is possible to reduce the dimensions of the central housing (230) necessary for internally housing the rollers and, consequently, enabling keeping the volumes modest.

In the same way, and with the same advantage, the portion of the lateral surface of the rollers (41, 42) of the second pair (4) of rollers opposite the contact portion (410, 420) is tapered: in this way it is possible to reduce the dimensions of the central housing (240) necessary for internally housing the rollers.

Correspondingly, in a further preferred aspect, the first support element (23) is inserted and predisposed in the first through-seating (21) by interposing of bearings (210) (as for example visible in FIG. 5) so as enable rotation of the first support element (23) in said first through-seating (21) according to an axis that is perpendicular to the carriage (2), while, in turn, the second support element (24) is inserted and predisposed in the second through-seating (22) by an interposing of bearings (220) (visible for example in FIG. 2) so as to enable the rotation of the second support element (24) in the second through-seating (22) according to an axis that is perpendicular to the carriage (2).

A further and other particularly advantageous aspect of the transport system (S) of the present invention consists in the fact that the first support element (23) is inserted and maintained in the first through-seating (21) by first elastic means (81) that are elastically preloaded so as to enable a translation of the first support element (23) with respect to the first through-seating (21) perpendicularly to the guide rail (1) as a consequence of an eventual change of height of the guide rail (1) with respect to a reference plane.

Correspondingly, the second support element (24) is also inserted and maintained in the second through-seating (22) by second elastic means (82) that are elastically preloaded so as to enable a translation of the second support element (24) with respect to the second through-seating (22) perpendicularly to the guide rail (1) as a consequence of an eventual change of height of the guide rail (1) with respect to a reference plane.

With these specifications, should there be any height displacements of the guide rail (1) with respect to a fixed reference plane, in the movement direction (M) of the carriage (2) along the loop-wound pathway of the guide rail, the support elements (23, 24) of the rollers (31, 32, 41, 42) can adjust the vertical position thereof with respect to the carriage (2) so as to maintain the rollers (31, 32) of the first pair (3) of rollers with the relative contact portions (310, 320) always in contact with the internal wall (11) and the external wall (12) of the guide rail (1), and so as to maintain the rollers (41, 42) of the second pair (4) of rollers with the relative contact portions (410, 420) always in contact with the internal wall (11) and the external wall (12) of the guide rail (1).

These specifications are particularly effective and advantageous in the particular and preferred embodiment of the transport system (S) of the invention, which will be described in the following and illustrated in FIG. 1A.

The above-mentioned first elastic means (81) comprise: a first plate (83), predisposed and mounted on the carriage (2) on an opposite side with respect to the guide rail (1) at the first through-seating (21) and so as to be able to translate vertically with respect to the carriage (2), a first elastic organ (84) that is elastically preloaded, constrained, at a first end, to the carriage (2) and, at a second end, to the first plate (83), the first support element (23) being predisposed in the first through-seating (21) so that the relative bearings (210) interposed there-between are borne and mounted on the first plate (83) (see for example FIGS. 3A, 3B, 4B, 5).

Figure 3A:
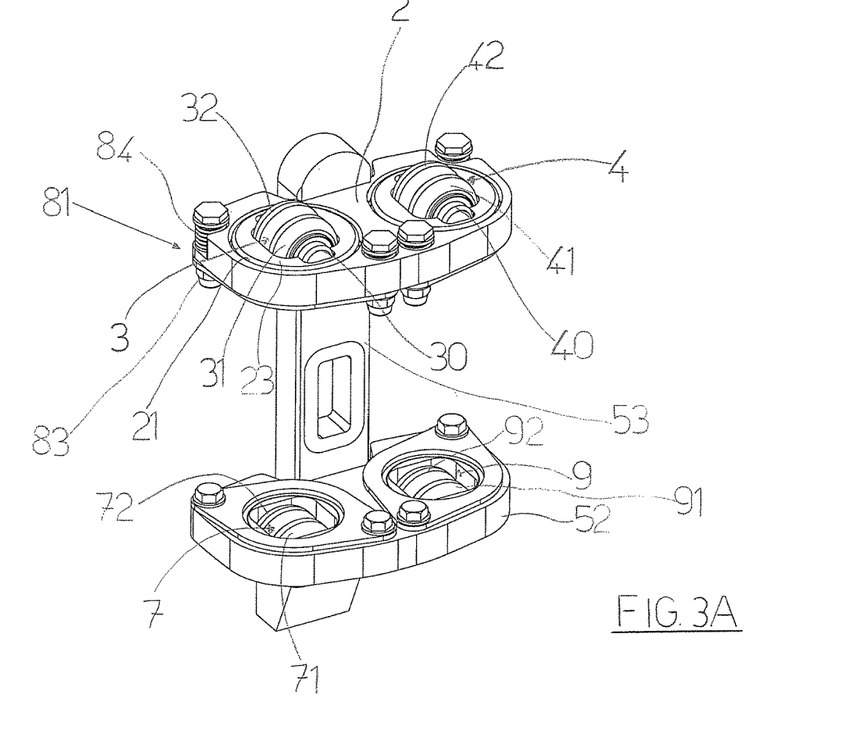
FIG. 3A illustrates particularly significant components of the transport system of the present invention in a perspective view.
Figure 3B:
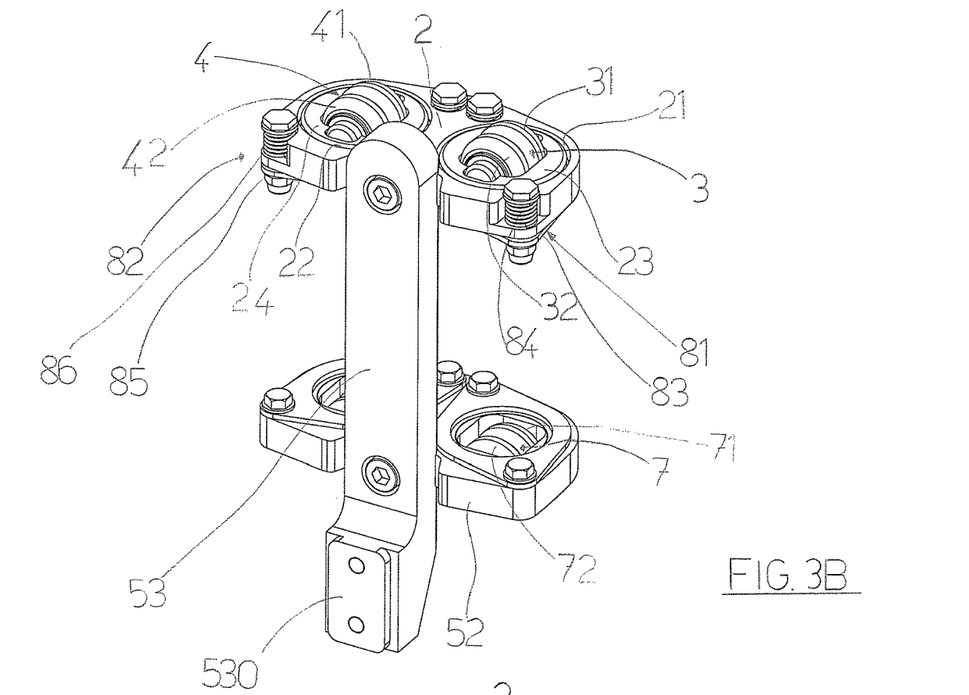
FIG. 3B illustrates the components of FIG. 3A according to a perspective view taken from a different angle.
Figure 4A:
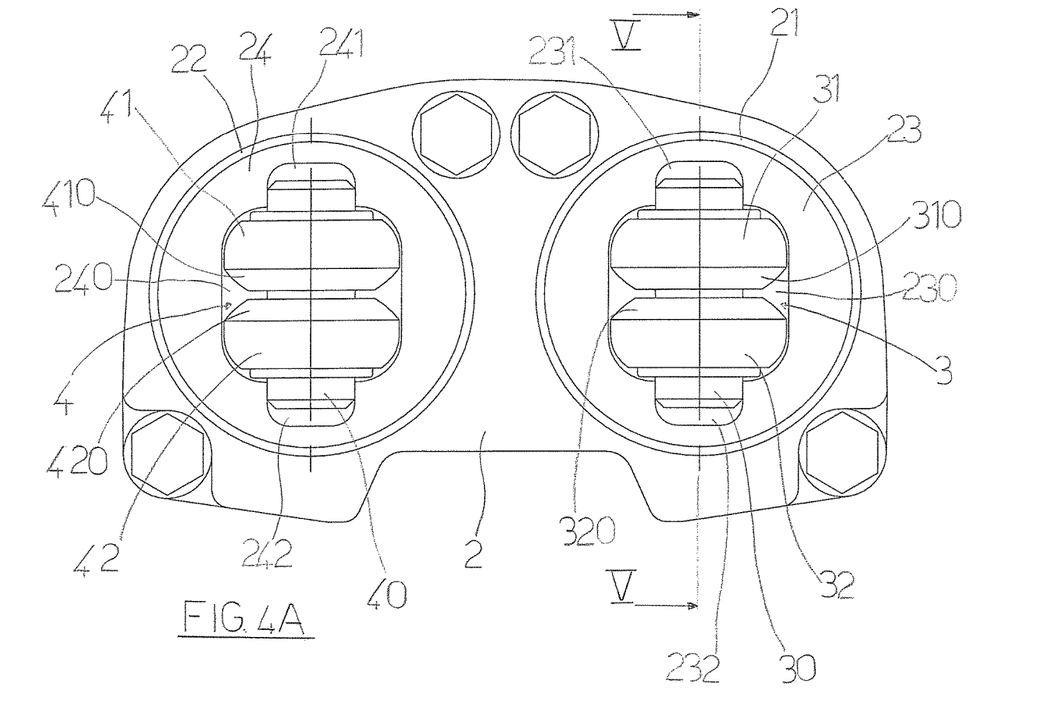
FIG. 4A illustrates a component of the transport system of the present invention in a plan view from above.
Figure 4B:
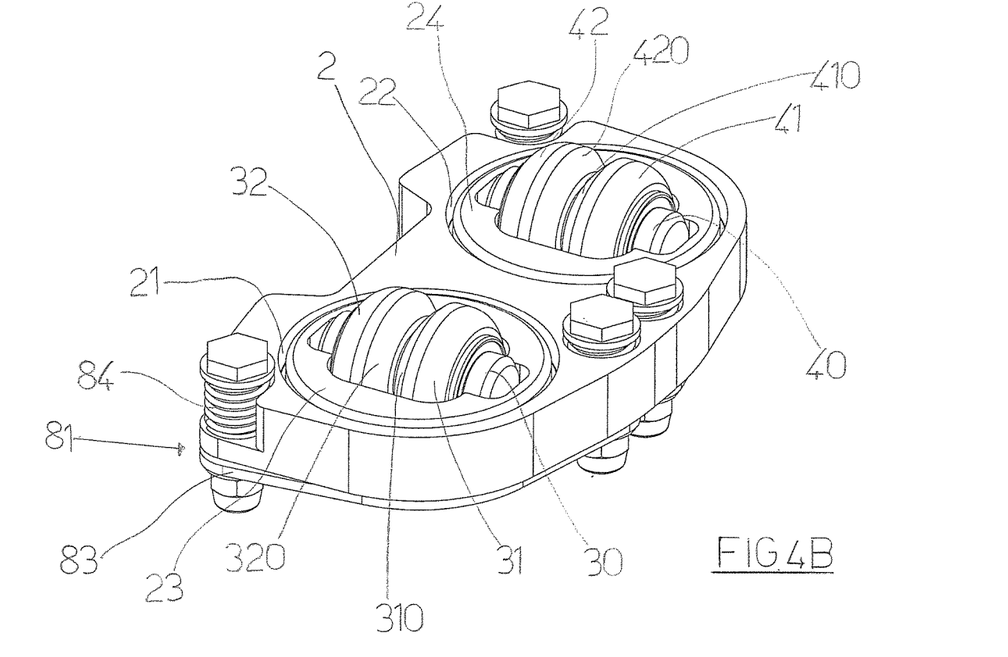
FIG. 4B is a perspective view of the component of the transport system illustrated in FIG. 4A.
Figure 5:
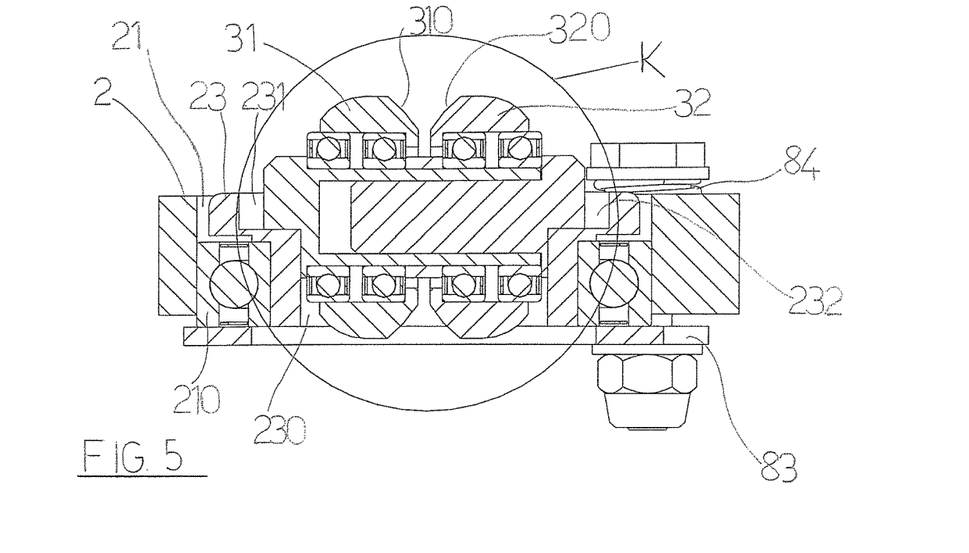
FIG. 5 is a view along section plane V-V of FIG. 4A.

In turn, the above-mentioned second elastic means (82) comprise: a second plate (85), predisposed and mounted on the carriage (2) on an opposite side with respect to the guide rail (1) at the second through-seating (22) and so as to be able to translate vertically with respect to the carriage (2), a second elastic organ (86) that is elastically preloaded, constrained, at a first end, to the carriage (2) and, at a second end, to the second plate (85), the second support element (24) being predisposed in the second through-seating (22) so that the relative bearings (220) interposed there-between are borne and mounted on the second plate (85) (see for example FIGS. 2, 3B).

The guide rail (1) of the transport system (S) can be realised, according to a preferred embodiment illustrated in the figures, so that the internal wall (11) and the external wall (12) are conformed so as to have, at the straight portions (R), a flat surface shape with a same inclination with respect to the axis of the guide rail (1) and, at the curved portions (C), a truncoconical shape.

Figure 1A:
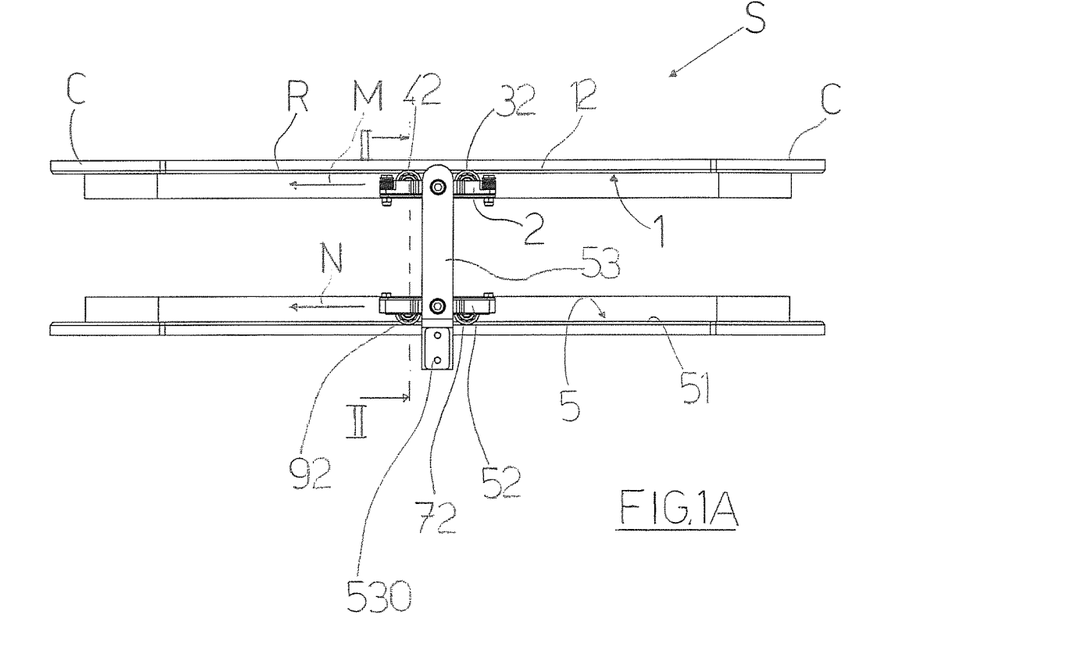
FIG. 1A illustrates a front view of the transport system of the present invention.
Figure 1B:
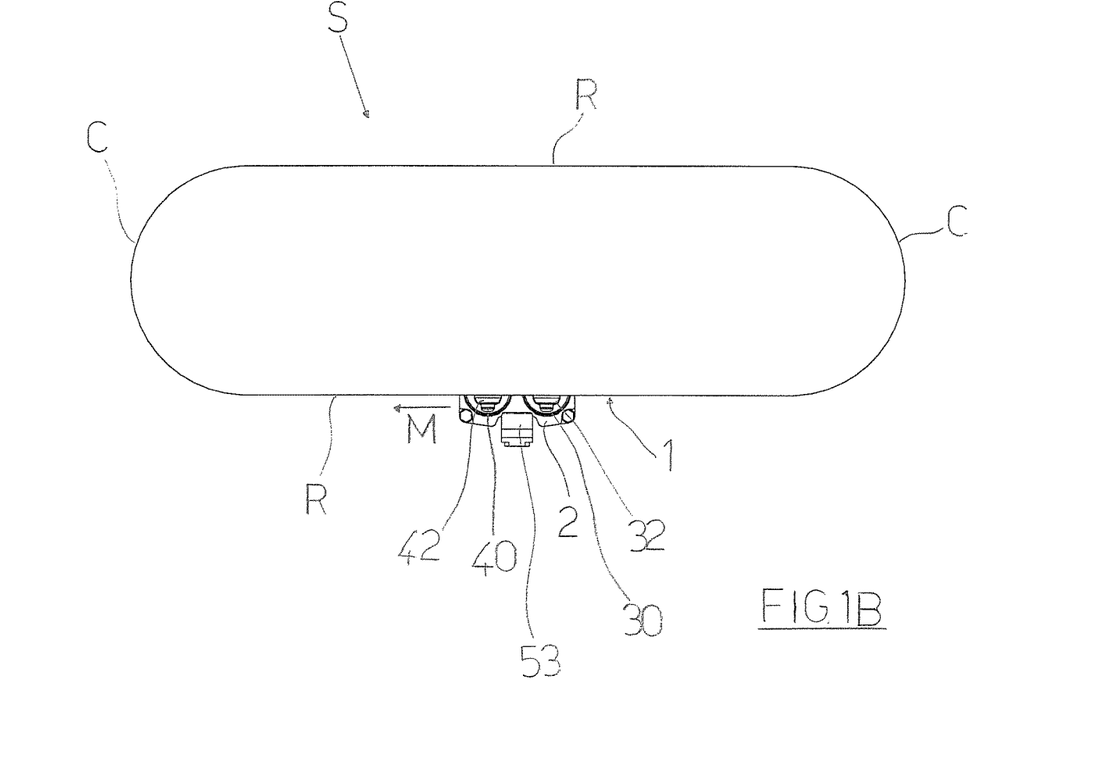
FIG. 1B illustrates the transport system of the present invention in a plan view from above.

FIG. 1A illustrates a preferred embodiment of the invention, in which the transport system further comprises: a second loop-wound guide rail (5) having a specular shape to the guide rail (1) and arranged opposite the guide rail (1) (for example below but it could also be arranged above), the second guide rail (5) being conformed so as to have an internal rolling wall (50) and an external rolling wall (51); a second carriage (52) and a connecting element (53), predisposed so as to connect the second carriage (52) to the carriage (2), so that when the carriage (2) is moved along the loop-wound pathway of the guide rail (1), the second carriage (52) is also contemporaneously moved along the loop-wound pathway of the second guide rail (5) in a movement direction (N) parallel to the movement direction (M) of the carriage (2).

See for example FIGS. 3A and 3B where the two carriages are illustrated (carriage (2), arranged superiorly, and the second carriage (52), arranged inferiorly), connected to one another by the connecting element (53).

In this case, the transport system (S) of the invention further comprises:

a third shaft (70) which is mounted and predisposed on the second carriage (52) transversally to the movement direction (N) of the second carriage (52);

a fourth shaft (90) which is mounted and predisposed on the second carriage (52) transversally to the movement direction (N) of the second carriage (52);

a third pair (7) of rollers (71, 72) and a fourth pair (9) of rollers (91, 92) which are mounted and predisposed on the second carriage (2) in the following way.

The rollers (71, 72) of the third pair (7) of rollers are rotatably mounted on the third shaft (70), flanked to one another and spaced so that a first roller (71) is arranged internally of the second guide rail (5) and has a contact portion (710) of the lateral surface thereof in contact with the internal wall (50) of the second guide rail (5) and can roll on the internal wall (50) when the second carriage (52) is moved in the movement direction (N) and so that a second roller (72) is arranged externally of the guide rail (5) and has a contact portion (720) of the lateral surface thereof in contact with the external wall (51) of the second guide rail (5) and can roll on the external wall (51) when the second carriage (52) is moved in the movement direction (N);

the rollers (91, 92) of the fourth pair (9) of rollers are rotatably mounted on the fourth shaft (90), flanked to one another and spaced so that a first roller (91) is arranged internally of the second guide rail (5) and has a contact portion (910) of the lateral surface thereof in contact with the internal wall (50) of the second guide rail (5) and can roll on the internal wall (50) when the second carriage (52) is moved in the movement direction (N) and so that a second roller (92) is arranged externally of the second guide rail (5) and has a contact portion (920) of the lateral surface thereof in contact with the external wall (51) of the second guide rail (5) and can roll on the external wall (51) when the carriage (52) is moved in the movement direction (N);

the third shaft (70) and the fourth shaft (90) being predisposed and mounted on the second carriage (52) so as to be pivoted according to an axis that is perpendicular to the second carriage (52), said axis being perpendicular to a plane comprising the third shaft (70) and the fourth shaft (90).

Figure 7:
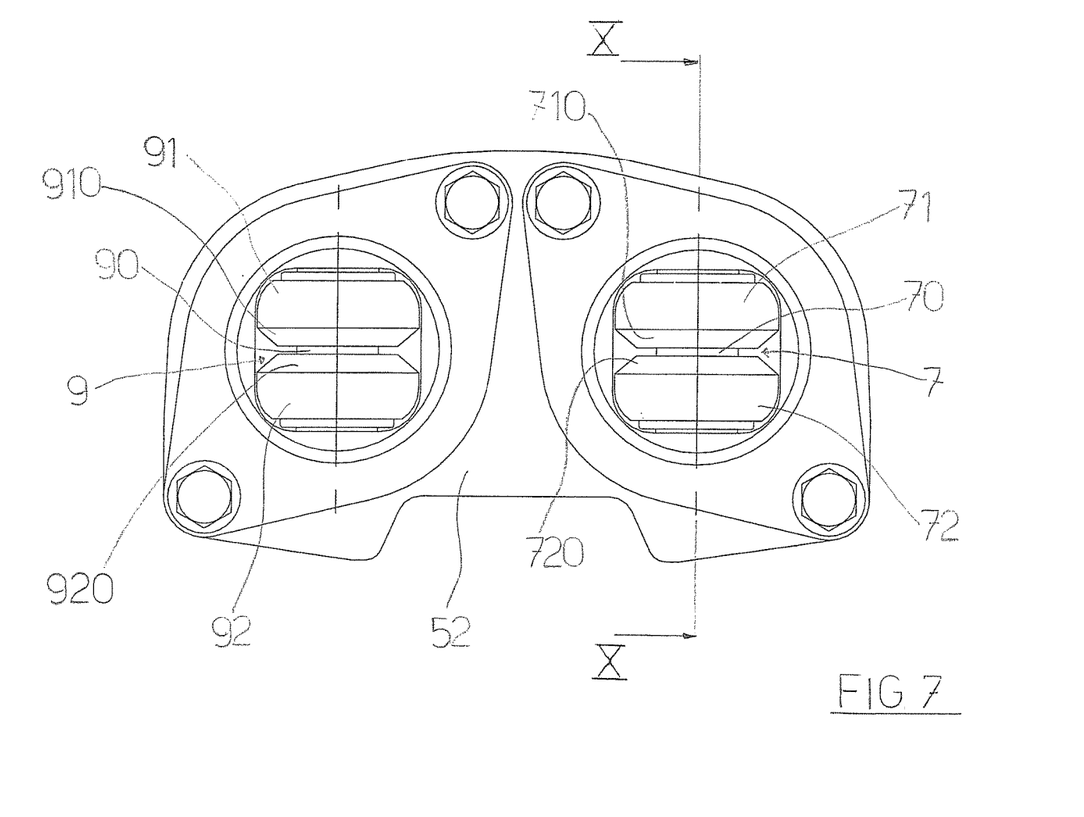
FIG. 7 illustrates a further component of the transport system of the present invention in a plan view from above.
Figure 8:
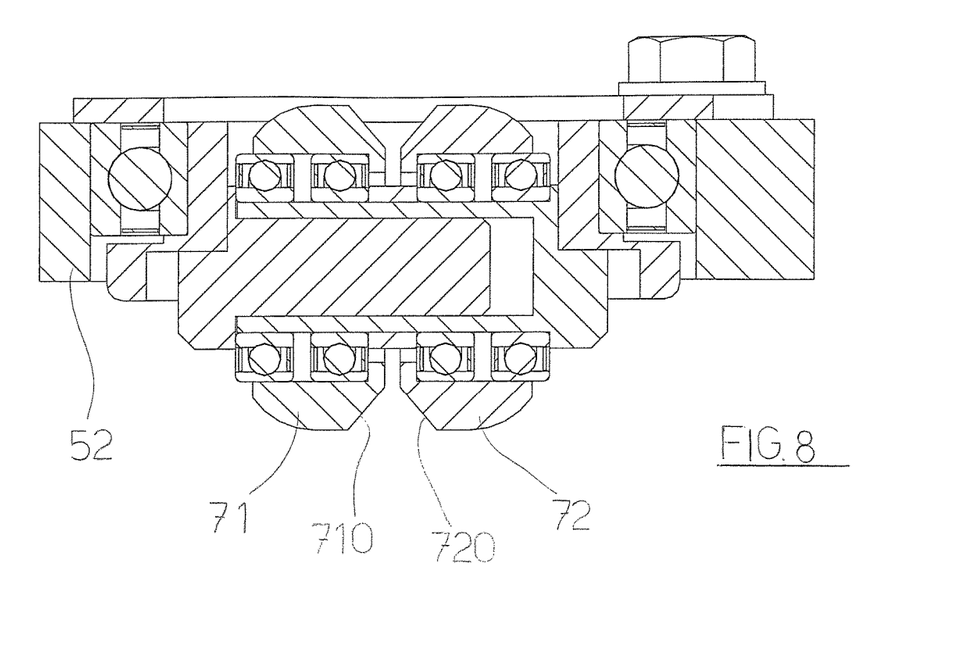
FIG. 8 is a view along section plane X-X of FIG. 7.

See for example FIGS. 2, 3A, 3B, where the second carriage (52) is illustrated coupled to the carriage (2) via the connecting member (53), i.e. FIGS. 7, 8 where the second carriage (52) has been illustrated independently.

Therefore, in this case too, as illustrated in the foregoing, the rollers (71, 72) of the third pair (7) of rollers and the rollers (91, 92) of the fourth pair (9) of rollers can change, with no particular force or stress, adapt and change the orientation thereof with respect to the second carriage (52) at each change of direction of the second guide rail (5), due to the possibility of the third shaft (70) and the fourth shaft (90) to be pivoted with respect to the second carriage (52) according to an axis that is perpendicular to the second carriage (52).

In this way, the rollers (71, 72) of the third pair (7) of rollers and the rollers (91, 92) of the fourth pair (9) of rollers can adapt and change the position thereof with respect to the internal wall (50) and external wall (51) of the guide rail (52) at the change of direction of the second guide rail (52) in the passage from a straight portion to a curved portion, and vice versa, so that the contact portions (710, 720, 910, 920) of the lateral surfaces of the rollers (71, 72, 91, 92) remain always in contact with, and can therefore roll on, the internal wall (50) and external wall (51) independently of the changes of direction of the guide rail (52).

The above-mentioned connecting element (53) between the carriage (2) and the second carriage (52) comprises coupling means (530) for the coupling and the fixing of a support element for support of a product to be transported (not illustrated).

With this particular structure, the transport system (S) guarantees excellent stability in the transport of the product, as the product, borne by the connecting element (53), is guided and supported in the movement thereof by the two carriages that are moved along the two guide rails, especially at changes of direction of the two guide rails, as in the passages from the straight portions to the curved portions, and vice versa.

Further, as described in the foregoing, the wear on the rollers is especially modest and contained, which gives them a long working life, surely greater with respect to the prior art systems mentioned in the foregoing.

The conformation of the contact portions of the rollers (71.72, 91, 92) of the third (7) and fourth (9) pair of rollers, the structure of the second carriage (52) and the ways in which the third shaft (70) and the fourth shaft (90) are predisposed and mounted on the second carriage (52) and are the same as those already described in relation to the rollers (31, 32, 41, 42) of the first (3) and second (4) pair of rollers, the carriage (1) and the first shaft (30) and the second shaft (40), and will therefore not be described in detail.

Briefly, in the second carriage (52) there will also be two through-seatings in which two support elements are predisposed for the support of the third and fourth shaft, where the rollers and the third and fourth shaft are inserted in housings and slots present in the two support elements, the two support elements being inserted in the through-seatings by the interposing of bearings that enable the shafts to be pivoted according to an axis perpendicular to the carriage.

In this case, however, the two support elements are inserted in the through-seatings of the second carriage (52) so as not to be able to vary the position thereof vertically in the two through-seatings: this is because the carriage (1) already includes the possibility of height-adjusting the position of the rollers and therefore, during the movement of the two carriages along the loop-wound pathway of the two guide rails, the compensation of any displacements and variations of the reciprocal distance between the two guide rails is carried out by the first elastic means (81) and the second elastic means (82) predisposed on the carriages (2) (the upper carriage).

From the above it is clear that the transport system of the present invention effectively obviates the various drawbacks which are encountered in the transport systems of the prior art described in the preamble hereto.

The invention claimed is:

1. A transport system for transport of products, comprising:
at least a guide rail having a loop-wound pathway and comprising straight portions and curved portions for connecting the straight portions, the guide rail being conformed so as to have an internal rolling wall and an external rolling wall;
at least a carriage for transport of at least a respective product that can be moved in a movement direction along the loop-wound pathway of the guide rail;
a first pair of rollers;
a second pair of rollers;
a first shaft mounted and predisposed on the carriage transversely to the movement direction of the carriage;
a second shaft mounted and predisposed on the carriage transversely to the movement direction of the carriage;
the rollers of the first pair of rollers being rotatably mounted on a first shaft, flanked to and distanced from one another so that a first roller is arranged internally of the guide rail and has a contact portion of the lateral surface thereof in contact with the internal wall of the guide rail and can roll on the internal wall when the carriage is moved in the movement direction and so that a second roller is arranged externally of the guide rail and has a contact portion of the lateral surface thereof in contact with the external wall of the guide rail and can roll on the external wall when the carriage is moved in the movement direction;
the rollers of the second pair of rollers being rotatably mounted on a second shaft, flanked to and distanced from one another so that a first roller is arranged internally of the guide rail and has a contact portion of the lateral surface thereof in contact with the internal wall of the guide rail and can roll on the internal wall when the carriage is moved in the movement direction and so that a second roller is arranged externally of the guide rail and has a contact portion of the lateral surface thereof in contact with the external wall of the guide rail and can roll on the external wall when the carriage is moved in the movement direction;
the first shaft and the second shaft being predisposed and mounted on the carriage so as to be pivoted according to an axis that is perpendicular to the carriage, said axis being perpendicular to a plane comprising the first shaft and the second shaft, so as to enable the rollers of the first pair of rollers and the rollers of the second pair of rollers to adapt a position/orientation thereof with respect to the internal wall and external wall of the guide rail at the change of direction of the guide rail in the passage from a straight portion to a curved portion, and vice versa, so that the contact portions of the lateral surfaces of the rollers remain always in contact with, and can therefore roll on, the internal wall and external wall independently of the changes of direction of the guide rail.

2. The transport system of claim 1, wherein the contact portions of the lateral surfaces of the rollers with which the rollers are in contact with the internal wall and external wall of the guide rail are conformed as a portion of a spherical cap.

3. The transport system of claim 1, wherein the carriage comprises a first through-seating and a second through-seating and in that it comprises a first support element predisposed in the first through-seating so as to be rotatable in said first through-seating according to an axis that is perpendicular to the carriage and a second support element predisposed in the second through-seating so as to be rotatable in said second through-seating according to an axis that is perpendicular to the carriage, and in that the first shaft is mounted and predisposed on the first support element and the second shaft is mounted and predisposed on the second support element.

4. The transport system of claim 3, wherein the first support element comprises a central housing and two slots arranged on opposite sides of the central housing and communicating with the central housing, the central housing having a shape and dimension such as to be able to accommodate and freely receive internally thereof the first pair of rollers so as to enable the rollers to be able to freely rotate about the first shaft and the two slots being arranged and dimensioned so a to be able to receive internally thereof by form coupling the ends of the first shaft, and in that the second support element in turn comprises a central housing and two slots arranged on opposite sides of the central housing and communicating with the central housing, the central housing having a shape and dimension such as to be able to accommodate and freely receive internally thereof the second pair of rollers so as to enable the rollers to be able to freely rotate about the second shaft and the two slots being arranged and dimensioned so as to be able to receive internally thereof by form coupling the ends of the second shaft.

5. The transport system of claim 3, wherein the first support element is inserted and predisposed in the first through-seating by interposing of bearings so as enable rotation of the first support element in said first through-seating according to an axis that is perpendicular to the carriage, and in that the second support element is inserted and predisposed in the second through-seating by an interposing of bearings so as to enable the rotation of the second support element in the second through-seating according to an axis that is perpendicular to the carriage.

6. The transport system of claim 5 wherein the first support element is inserted and maintained in the first through-seating by first elastic means that are elastically preloaded so as to enable a translation of the first support element with respect to the first through-seating perpendicularly to the guide rail as a consequence of an eventual change of height of the guide rail with respect to a reference plane so as to maintain the rollers of the first pair of rollers predisposed on the first support element with the respective contact portions always in contact with the internal wall and the external wall of the guide rail, and in that the second support element is inserted and maintained in the second through-seating by second elastic means that are elastically preloaded so as to enable a translation of the second support element with respect to the second through-seating perpendicularly to the guide rail as a consequence of an eventual change of height of the guide rail with respect to a reference plane so as to maintain the rollers of the second pair of rollers predisposed on the second support element with the respective contact portions always in contact with the internal wall and the external wall of the guide rail.

7. The transport system of claim 6, wherein the first elastic means comprise: a first plate, predisposed and mounted on the carriage on an opposite side with respect to the guide rail at the first through-seating and so as to be able to translate vertically with respect to the carriage, a first elastic organ that is elastically preloaded, constrained, at a first end, to the carriage and, at a second end, to the first plate, the first support element being predisposed in the first through-seating so that the respective bearings interposed there-between are borne and mounted on the first plate;

and in that the second elastic means comprise a second plate, predisposed and mounted on the carriage on an opposite side with respect to the guide at the second through-seating and so as to be able to translate vertically with respect to the carriage, a second elastic organ that is elastically preloaded and constrained, at a first end, to the carriage and, at a second end, to the second plate, the second support element being predisposed in the second through-seating so that the respective bearings interposed there-between are borne and mounted on the second plate.

8. The transport system of claim 1, wherein the internal wall and the external wall of the guide rail are conformed such as to have, at the straight portions, a flat surface shape with a same inclination with respect to the guide rail and, at the curved portions, a truncoconical shape.

9. The transport system of claim 1, further comprising:
a second loop-wound guide rail having a specular shape to the guide rail and arranged opposite the guide rail, the second guide rail being conformed so as to have an internal rolling wall and an external rolling wall;
a second carriage;
a connecting element, predisposed so as to connect the second carriage to the carriage, so that when the carriage is moved along the loop-wound pathway of the guide rail, the second carriage is also contemporaneously moved along the loop-wound pathway of the second guide rail in a movement direction parallel to the movement direction of the carriage;
a third pair of rollers;
a fourth pair of rollers;
a third shaft mounted and predisposed on the second carriage transversely to the movement direction of the second carriage;
a fourth shaft mounted and predisposed on the second carriage transversely to the movement direction of the second carriage;
the rollers of the third pair of rollers being rotatably mounted on the third shaft, flanked to one another and spaced so that a first roller is arranged internally of the second guide rail and has a contact portion of the lateral surface thereof in contact with the internal wall of the second guide rail and can roil on the internal wall when the second carriage is moved in the movement direction and so that a second roller is arranged externally of the guide rail and has a contact portion of the lateral surface thereof in contact with the external wall of the second guide rail and can roll on the external wall when the carriage is moved in the movement direction;
the rollers of the fourth pair of rollers being rotatably mounted on the fourth shaft, flanked to one another and spaced so that a first roller is arranged internally of the second guide rail and has a contact portion of the lateral surface thereof in contact with the internal wall of the second guide rail and can roll on the internal wall when the second carriage is moved in the movement direction and so that a second roller is arranged externally of the second guide and has a contact portion of the lateral surface thereof in contact with the external wall of the second guide rail and can roll on the external wall when the second carriage is moved in the movement direction;
the third shaft and the fourth shaft are predisposed and mounted on the second carriage so as to be pivoted according to a axis that is perpendicular to the second carriage, said axis being perpendicular to a plane comprising the third shaft and the fourth shaft, so as to enable the rollers of the third pair of rollers and the rollers of the fourth pairof rollers to adapt a position/orientation thereof with respect to the internal wall and the external wall of the second guide rail at the change of direction of the second guide rail in the passage from a straight portion to a curved portion, and vice versa, so that the contact portions of the lateral surfaces of the rollers remain always in contact with, and can therefore roll on, the internal wall and external wall independently of the changes of direction of the second guide rail.

10. The transport system of claim 9 wherein the connecting element comprises coupling means for the coupling and the fixing of a support element for support of a product to be transported.

* * * * *